(12) United States Patent
Hogan

(10) Patent No.: US 11,220,189 B1
(45) Date of Patent: Jan. 11, 2022

(54) SELF-CHARGING VEHICLE

(71) Applicant: Joseph Hogan, Argyle, TX (US)

(72) Inventor: Joseph Hogan, Argyle, TX (US)

( * ) Notice: Subject to any disclaimer, the term of this patent is extended or adjusted under 35 U.S.C. 154(b) by 0 days.

(21) Appl. No.: 17/225,475

(22) Filed: Apr. 8, 2021

(51) Int. Cl.
| | | |
|---|---|---|
| *B60L 53/22* | (2019.01) | |
| *B60L 1/00* | (2006.01) | |
| *B60L 50/60* | (2019.01) | |
| *B60L 53/53* | (2019.01) | |

(52) U.S. Cl.
CPC ............ *B60L 53/22* (2019.02); *B60L 1/00* (2013.01); *B60L 50/60* (2019.02); *B60L 53/53* (2019.02)

(58) Field of Classification Search
CPC .......... B60L 53/22; B60L 50/60; B60L 53/53; B60L 1/00
See application file for complete search history.

(56) References Cited

U.S. PATENT DOCUMENTS

| | | | | |
|---|---|---|---|---|
| 10,479,197 B1 * | 11/2019 | Kim | .......... | F03D 9/11 |
| 2018/0086201 A1 * | 3/2018 | Antrobus | ......... | B60L 53/11 |
| 2020/0086762 A1 * | 3/2020 | Kirchhoffer | ......... | B60L 50/61 |

OTHER PUBLICATIONS

Wikipedia, Alternator. Last edited on Mar. 23, 2021, at 13:02 (UTC).
Wikipedia, Automotive Battery. Last edited on Mar. 5, 2021, at 11:10 (UTC).
Wikipedia, Belt (Mechanical). Last edited on Mar. 24, 2021, at 07:55 (UTC).
Wikipedia, Electric Car. Last edited on Mar. 20, 2021, at 18:51 (UTC).
Wikipedia, Pneumatic Motor. Last edited on Feb. 28, 2021, at 15:54 (UTC).
Wikipedia, Transmission (Mechanics). Last edited on Apr. 7, 2021, at 11:52 (UTC).

* cited by examiner

*Primary Examiner* — Jared Fureman
*Assistant Examiner* — Duc M Pham
(74) *Attorney, Agent, or Firm* — Stonebridge IP, PLLC

(57) ABSTRACT

A motor vehicle includes a vehicle including a motor, a battery, two or more wheels, an air pump, a compressed air tank, a pneumatic motor connected to the air tank, an alternator/generator connected to the pneumatic motor, the alternator/generator connected to a vehicle battery, the battery connected to the vehicle motor. The air pump provides air to the air tank, pressurized air from the air tank operates the pneumatic motor, the pneumatic motor operates the alternator/generator, the alternator/generator provides power to the battery; and the battery provides power to the motor and/or to one or more electrical components associated with the vehicle.

14 Claims, 3 Drawing Sheets

SELF-CHARGING VEHICLE

BACKGROUND OF THE DISCLOSURE

Field of the Invention

This disclosure is directed to vehicles including passenger vehicles and trucks, e.g., cars, SUVs, pickup trucks, larger cargo trucks, and motorcycles and includes vehicles powered with electric power.

Description of the Related Art

Electric vehicles, in general, need to be affordable and convenient to operate in order for consumers to be willing to purchase them. Many consumers are in a hurry and are impatient. At present, it is not convenient to go on a longer trip using an electric vehicle since electric cars require stops for lengthy periods of time to recharge as well as detours to find an appropriate charging station. Such factors severely limit the popularity and sales of electric cars.

Manufacturers are attempting to solve these problems by switching to larger, heavier batteries which nevertheless increase the cost, and weight, and expense of an electric vehicle. Accordingly, electric vehicles are generally too expensive and inconvenient for the average consumer.

SUMMARY OF THE INVENTION

A motor vehicle of the disclosure includes a vehicle including a motor, a battery, two or more wheels, an air pump, a pneumatic air tank, a pneumatic motor connected to the air tank, an alternator/generator connected to the pneumatic motor, the alternator/generator connected to a vehicle battery, the battery connected to the vehicle motor. The air pump transmits air to the air tank, pressurized air from the air tank operates the pneumatic motor, the pneumatic motor operates the alternator/generator, the alternator/generator provides power to a battery; and the battery provides power to the motor and/or to one or more electrical components associated with the vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
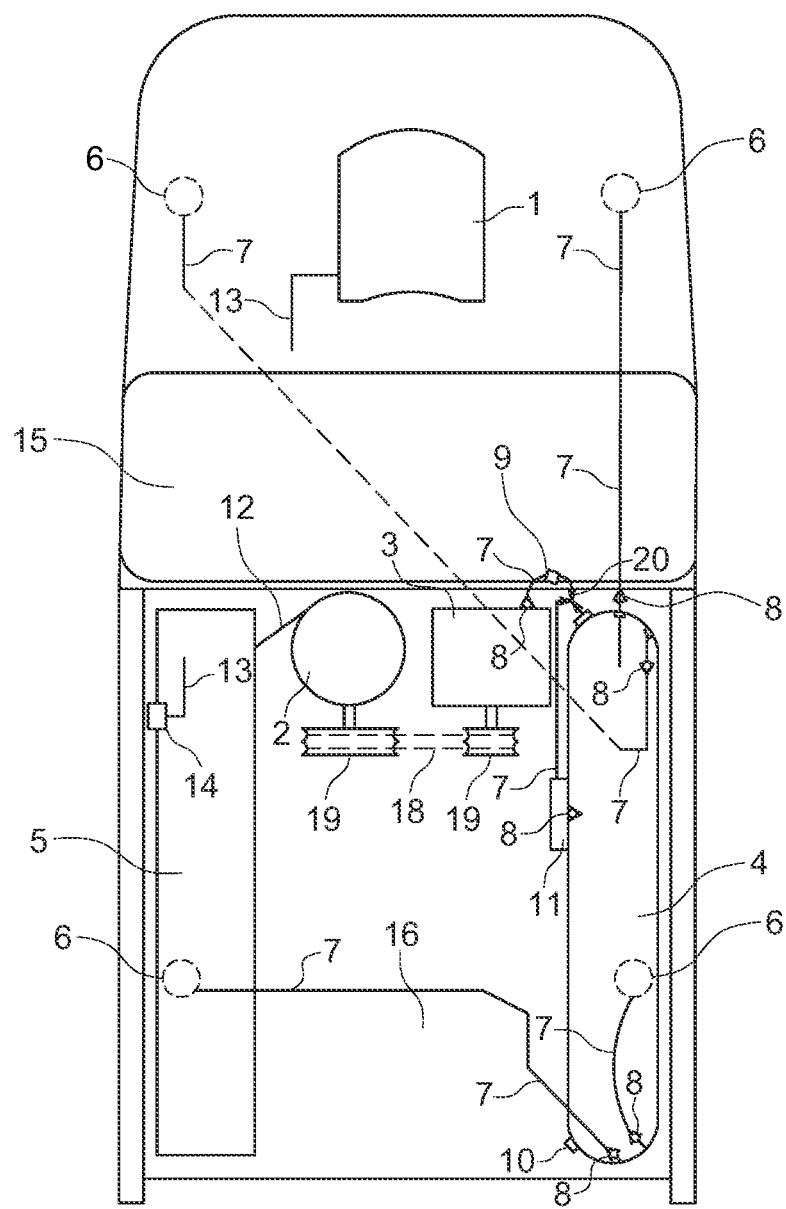
FIG. 1 shows a self-charging vehicle of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The present disclosure provides a self-charging electric vehicle. In embodiments, a self-charging vehicle of the disclosure includes air pumps that supply air pressure to a pneumatic motor which drives an electric generator. Multiple air pumps may be added to the vehicle at various locations (including in the position of shock absorbers) as well. Air pumps may operate via the up and down, accelerating and decelerating, and turning movement of a moving vehicle. Air hoses large enough to move a flow of air quickly are desirably used.

One or more air pumps therefore create air pressure while the vehicle is in use. This can include using back oriented and front oriented pumps for when the vehicle is accelerating or decelerating, as well as side pumps that generate air pressure when the vehicle is turning. For example, one side of a vehicle will tend to lift when the vehicle is turning while the opposite side tilts downwards. Correctly oriented air pumps can generate air pressure from turning action.

In embodiments, air pressure from each pump may be transmitted through air hoses, optional one-way valves, optional pressure regulator(s), and can be delivered to an air pressure tank. The air pressure tank may have an optional safety valve to prevent a blowout or component damage. Pressure in the tank can be increased with an optional air amplifier if necessary. Pressure may be decreased by using a smaller number of pumps in embodiments as well. In embodiments, air pressure from each air pump may go to a single air pressure tank. This allows the air pressure to be combined into a single tank with a single air pressure.

Pneumatic motors can be used to convert the compressed air into mechanical work or energy. In one specific example, a pneumatic motor may operate on principles similar to an impact wrench. The amount of torque generated with a pneumatic motor or via air driven impact can turn a permanent magnet generator/alternator which can in turn charge a battery for powering an electric vehicle motor and/or electrical components.

The vehicle therefore operates air pumps, creating air pressure through its own weight and movement while in use, and the resulting air pressure is converted through one or more pneumatic motors to drive an electric generator/alternator to charge a vehicle battery. The battery operates an electric motor, and the motor powers the vehicle.

In embodiments, as mentioned, a pneumatic motor may operate on principles similar to handheld impact wrenches as one example. Such devices can generate upwards of 5000 pounds of torque. In one specific example, such a pneumatic motor may be bolted or secured to the vehicle, adjusted in size as necessary, and can then drive, for example, a permanent magnet generator/alternator to charge a vehicle battery. In embodiments, a custom-built pneumatic motor with large bore cylinders may also be used.

In embodiments, the air pumps may be used in place of, or next to, or parallel to, existing shock absorbers. In this case, the air pumps generally will be connected to a wheel or a wheel axle and to the vehicle frame. The number and size of the air pumps including their lengths and diameters is adjustable and determined by the size, weight, and design of the vehicle. The size of the generator/alternator is also determined by battery size, design, weight, etc., of the vehicle.

The size of the vehicle battery is also determined by the size of the motor, design, and weight of the vehicle. In embodiments, the size and weight of the vehicle battery may be decreased compared with vehicle batteries currently in use on electric vehicles. That is, an extra-large battery as used in many electric vehicles may not be necessary to the self-charging feature of the disclosed vehicle.

Once a battery is fully charged, power from the generator can also directly operate the motor, lights, gauges, etc.

Generator power can also be used to start a vehicle, move the vehicle slowly in traffic, provide additional power for fast acceleration, etc., and can generally be used as necessary for vehicle power consumption.

In embodiments, the components including the pneumatic motor, the air tank, and the generator/alternator can be located and arranged at a convenient position in the vehicle to take up the least space. For example, the components can be mounted in a pickup truck bed and could occupy approximately one fourth of the cargo space of a standard pickup truck bed. The location and shape of the components is optional and is varied according to the vehicle.

In a passenger vehicle, the battery may be shaped, e.g., cylindrical, to mount under the vehicle (e.g., parallel to the drive train). The generator and pneumatic motor may fit in a trunk, nevertheless, size and location are optional, and depend on the size, weight, and design of the vehicle.

FIG. 1 shows a self-charging vehicle of the disclosure. FIG. 1 shows electric motor 1, alternator/generator 2, pneumatic motor 3, air tank 4, battery 5, air pumps 6, air hoses 7, one-way valves 8, air pressure regulator 9, high-pressure safety valve 10, adjustable air amplifier 11, wire from generator/alternator 12, wire from battery 13, voltage regulator 14, truck cab 15, truck bed 16, belt/chain 18, pulley/sprocket/etc. 19, and pneumatic three-way valve 20.

Figure 2:
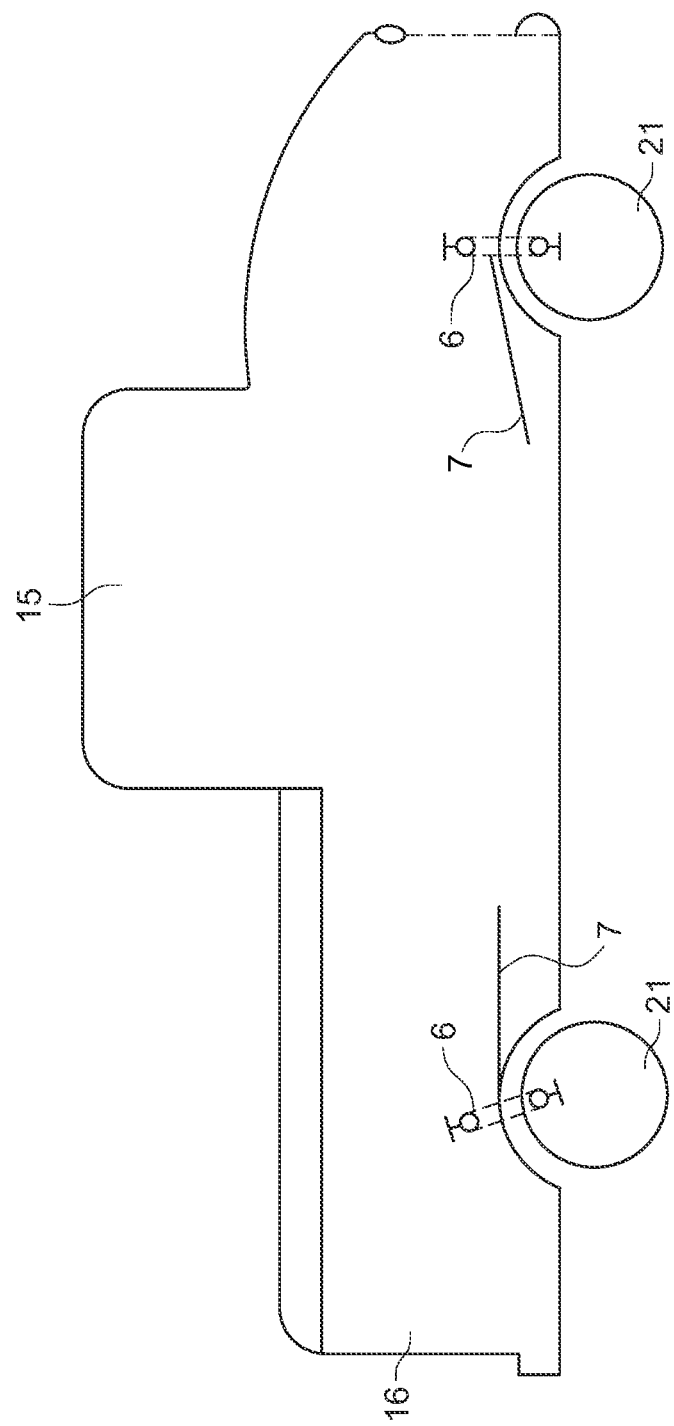
FIG. 2 shows air pump in a wheel well of a car attached in the place of a shock absorber.

FIG. 2 shows an air pump 6 located at the wheel 21 of a car 15 attached in the place of a shock absorber.

Figure 3:
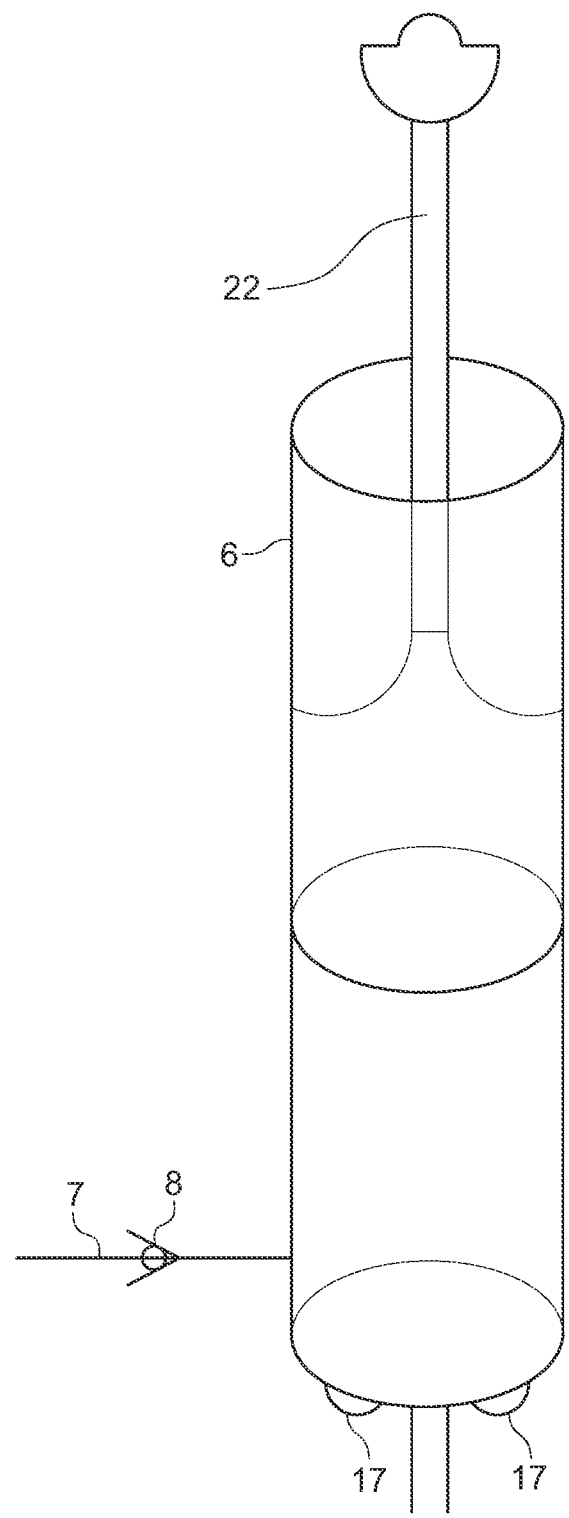
FIG. 3 shows an air pump of the disclosure.

FIG. 3 shows an air pump 6 of the disclosure. FIG. 3 shows piston 22, air hose 7, one-way valve 8, and one-way air vents 17.

A vehicle of the disclosure generally refers to passenger vehicles. This includes cars, sedans, trucks, including light duty trucks and pickup trucks, SUVs, vans, and the like. This also includes motorcycles, scooters, buggy's, and other smaller transport vehicles as well. Typically, a vehicle of the disclosure may have two or four wheels but may also have six, eight, or more wheels in the case of, for example, large trucks. The vehicles of the disclosure include electric powered vehicles as well as hybrid electric vehicles. See e.g., Electric car, Wikipedia, The Free Encyclopedia, date of last revision: 20 Mar. 2021, herein incorporated by reference.

An air pump of the disclosure generally refers to a positive displacement pump capable of generating air pressure from mechanical motion. In one example, an air pump including a cylinder and piston can be used. In this embodiment, up and down motion of the piston in the cylinder via positive displacement creates air pressure through an exhaust. Generally, any air pump that can generate air pressure from a mechanical up and down or lateral type vehicle movement can be used.

An air tank as used herein is generally a pneumatic air tank capable of receiving and providing a supply of pressurized air. Generally, the air tank will be able to accept a flow of pressurized air from a source, store the air under pressure, and then provide a supply of pressurized air. Essentially, any air receiver and compressed air storage tank of an appropriate size can be used. Generally, an air storage tank of the disclosure can be a 5-to-50-gallon pneumatic air tank including an inlet for receiving pressurized air and an outlet for delivering air pressure and may further include a pressure gauge, emergency outlet valve, moisture outlet valve, etc.

Air of the disclosure includes normal atmospheric air as well as alternatives including nitrogen and other inert gases.

A pneumatic motor of the disclosure is a motor that generally converts compressed or pressurized air energy to mechanical work typically through either linear or rotary motion. Linear motion can come from either a diaphragm or piston actuator, while rotary motion may be supplied by either a vane type air motor, piston air motor, air turbine, or gear type motor as examples. Specific examples include pneumatic motors similar to those used in an impact wrench. See e.g., Pneumatic motor, Wikipedia, The Free Encyclopedia, date of last revision: 28 Feb. 2021, herein incorporated by reference.

An alternator/generator of the disclosure includes an electrical generator that converts mechanical energy to electrical energy in the form of alternating current. Typically, many alternators use a rotating magnetic field with a stationary armature. In other embodiments, a linear alternator or a rotating armature with a stationary magnetic field may be used. Any appropriate AC electrical generator can be used, and specific examples include typical alternators/generators used in automobiles and trucks. See Alternator, Wikipedia, The Free Encyclopedia, date of last revision: 23 Mar. 2021, herein incorporated by reference.

Transmission systems for converting energy, e.g., torque, generated by the pneumatic motor into energy usable by the alternator/generator are as known and used in the art and particularly, include the well known belt and pulley transmission systems, gear based systems, chains, etc. See Transmission (mechanics), Wikipedia, The Free Encyclopedia, date of last revision: 7 Apr. 2021, herein incorporated by reference; and Belt (mechanical), Wikipedia, The Free Encyclopedia, date of last revision: 24 Mar. 2021, herein incorporated by reference.

A battery of the disclosure may be a car battery which is generally a rechargeable battery. A battery of the disclosure also includes high-voltage, high-power, batteries typically used in electric vehicles or hybrid vehicles. In embodiments, a vehicle may include more than one battery and may include an auxiliary battery typically used in passenger cars and trucks for a vehicle's electrical components as well as a high-voltage battery for powering the vehicle's motor. Typical batteries can include 12 V to 24 V batteries. As mentioned, a battery system for an electric powered vehicle of the disclosure may include a high-voltage, high-power battery for powering the vehicle's motor as well as an auxiliary battery of lower voltage and amperage for powering electrical components and providing additional power to the vehicle motor when required. The contemplated batteries are generally rechargeable. See Automotive battery, Wikipedia, The Free Encyclopedia, date of last revision: 5 Mar. 2021, herein incorporated by reference.

Vehicle electrical components generally include standard electric powered lights and devices used in passenger vehicles, trucks, motorcycles, etc. This generally includes electric powered gauges, audio and visual entertainment and information systems, lighting, computer processors and associated components, etc.

Air hoses and wiring of the disclosure generally include hoses and electrical wiring typically used in passenger vehicles, trucks, etc. In examples, rubber air hoses capable of handling high air pressure of 300 to 500 psi or more can be used.

Example 1

A self-charging pickup truck includes an electric motor electrically connected to a vehicle battery. The pickup truck has four air pumps disposed in the wheel wells of the vehicle in the position of standard shock absorbers. The air pumps are connected through air hoses to a one-way valve which is in turn connected to a generally cylinder-shaped air tank disposed lengthwise along the vehicle inside the truck bed. The air tank is connected to a pneumatic motor which includes a belt and pulley system that is driven by torque generated by the pneumatic motor. The belt and pulley system are connected to an alternator which is electrically connected to a vehicle battery. The battery includes a voltage regulator. The battery is connected to a vehicle motor which powers the vehicle.

Example 2

An electric scooter includes an electric motor electrically connected to a battery. The scooter has two air pumps connected to the wheels in the positions of shock absorbers. The air pumps are connected through air hoses to a one-way valve which is connected to a pressurized air tank disposed under the seat of the scooter. The air tank is connected to a pneumatic motor which includes a belt and pulley system that is operated by the torque generated by the pneumatic motor. The belt and pulley system is connected to an electric generator which is electrically connected to the battery. The battery includes a voltage regulator and supplies power to the electric motor.

While this disclosure includes specific examples, it will be apparent after an understanding of the disclosure of this application has been attained that various changes in form and details may be made in these examples without departing from the spirit and scope of the claims and their equivalents.

The invention claimed is:

1. A motor vehicle comprising:
 a vehicle comprising a motor, a battery, and two or more wheels;
 an air pump that generates air pressure through up and down, accelerating and decelerating, and/or turning movement of the motor vehicle;
 an air tank configured to hold air under pressure;
 a pneumatic motor connected to the air tank;
 the pneumatic motor connected to an alternator/generator;
 the alternator/generator connected to a vehicle battery;
 the battery connected to the motor;
 wherein the air pump transmits air to the air tank, pressurized air from the air tank operates the pneumatic motor, the pneumatic motor operates the alternator/generator, the alternator/generator provides power to the battery; and the battery provides power to the motor and/or to one or more electrical components associated with the vehicle.

2. The motor vehicle of claim 1, wherein the vehicle includes two wheels.

3. The motor vehicle of claim 1, wherein the vehicle includes four wheels.

4. The motor vehicle of claim 1, wherein the vehicle includes four air pumps.

5. The motor vehicle of claim 4, wherein the air pumps are disposed at or near the vehicle wheels connecting a wheel or wheel axle with the vehicle frame.

6. The motor vehicle of claim 5, wherein the air pumps are located in the place of shock absorbers in the motor vehicle.

7. The motor vehicle of claim 1, wherein the vehicle is an electric powered vehicle.

8. The motor vehicle of claim 1, wherein the vehicle is a hybrid electric vehicle.

9. The motor vehicle of claim 1, wherein the vehicle includes two batteries.

10. The motor vehicle of claim 9, wherein one battery powers the vehicle's motor, and the second battery is an auxiliary battery for powering vehicle electrical components.

11. The motor vehicle of claim 9, wherein the alternator/generator is connected to both batteries.

12. The motor vehicle of claim 1, further including a one-way valve disposed between the air pump and the air tank.

13. The motor vehicle of claim 1, wherein the air pump is a positive displacement air pump that generates air pressure from mechanical motion.

14. The motor vehicle of claim 13, wherein the air pump includes a cylinder and piston.

* * * * *